United States Patent [19]

Gerber

[11] Patent Number: 4,510,232

[45] Date of Patent: Apr. 9, 1985

[54] OPTICAL DATA STORAGE ELEMENT

[75] Inventor: Arthur M. Gerber, Belmont, Mass.

[73] Assignee: Polaroid Corporation, Cambridge, Mass.

[21] Appl. No.: 580,430

[22] Filed: Feb. 15, 1984

Related U.S. Application Data

[63] Continuation of Ser. No. 454,069, Dec. 28, 1982, abandoned.

[51] Int. Cl.³ .............................................. G03C 5/04
[52] U.S. Cl. .................................. 430/494; 430/363; 430/945; 346/135.1; 430/495; 430/496
[58] Field of Search ............... 430/945, 363, 494, 346; 346/135.1

[56] References Cited

U.S. PATENT DOCUMENTS 4,241,355 12/1980 Bloom et al. ..................... 346/135.1
4,331,751 5/1982 Isaacson et al. ...................... 430/37
4,362,806 12/1982 Whitmore ........................... 430/202

FOREIGN PATENT DOCUMENTS 2620283 11/1976 Fed. Rep. of Germany .

OTHER PUBLICATIONS

Condensed Chemical Dictionary, 5th Ed., 1956, pp. 246–247.

Primary Examiner—Mary F. Downey
Attorney, Agent, or Firm—Philip G. Kiely

[57] ABSTRACT

An element for optically recording digitally encoded information which comprises a support carrying an array of discrete regular geometric spaced depressions in a surface, each of said depressions carrying material capable of a transformation in response to a level of radiation adapted to effect said transformation, wherein said transformation is optically detectable.

4 Claims, No Drawings

OPTICAL DATA STORAGE ELEMENT

This is a continuation of application Ser. No. 454,069, filed Dec. 28, 1982, now abandoned.

BACKGROUND OF THE INVENTION

Materials are known to the art for optically recording digitally encoded information. Such materials store data by means of bit-by-bit recording with a laser. The stored data is retrieved by "reading" the element with the same or a different laser which measures the effect produced on the element by the recording laser. The "reading" laser is generally of lower power to prevent unwanted "writing" during the data retrieval mode.

The materials known for such optical recording elements generally fall under the classes of thin metal films, organic dyes in a polymer matrix, metal-containing polymers, bubble-forming materials and photographic silver halide film. Because it is desired in the art to have a direct-read-after-write capability, photographically developed silver halide, which possesses superior sensitivity and archival quality characteristics, is not widely used because of the necessity for processing before reading.

The thin metal film element generally comprises tellurium or a tellurium alloy such as that described in U.S. Pat. No. 4,222,071 issued Sept. 9, 1980 to Alan E. Bell and Robert A. Bartolini. Exposure to a recording laser results in a hole ablated in the tellurium layer by the laser. One advantage of the tellurium-based material is relatively high sensitivity, since low thermal conductivity of the metal will prevent the incident heat from the laser from being dissipated before the hole is formed. In addition, the power requirement for accomplishing such ablation is relatively low due to the relatively low melting point of tellurium compared to many other metals. However, tellurium is rapidly oxidized and thus lacks the long-term stability desired in the industry. Alloying tellurium with other materials and encapsulating the tellurium film in plastic enhances stability but usually lowers sensitivity.

An example of an optical recording element employing an organic dye in a polymer matrix may be found in U.S. Pat. No. 4,336,545, issued June 22, 1982 to Dennis G. Howe, Alan B. Marchant and Joseph J. Wrobel, which is directed to an element comprising a heat-deformable dye-polymer layer overlying a reflective surface. Pits in the recording surface which result from the laser exposure may be "read" by measuring a phase difference from light reflected from pitted and non-pitted areas. This type of material is referred to as a phase-shift type system.

An optical recording element containing a metal disposed in a polymeric matrix may be illustrated by U.S. Pat. No. 4,269,917 issued May 26, 1981 to Jerome Drexler and Eric W. Bouldin, which is directed to a reflective data storage medium comprising a low-melting colloid matrix on a substrate with a surface layer of non-filimentary silver particles disposed in said matrix wherein the volume concentration of the silver particles is greater at the surface of said colloid matrix than the interior of said matrix and wherein the surface has an areawise substantially uniform reflectivity to visible light. Laser writing is accomplished by burning through the reflective component of the element with a laser beam thereby creating a hole in the reflective component which may be detected by, for example, another laser which detects the reduced reflection as a result of the hole formation.

Optical recording media that employ bubble formation comprise a layer of vaporizable material enclosed in a higher melting point material. The laser writing beam passes through the higher melting point material without effect and vaporizes the underlying material producing a bubble that has a different reflectivity from the surrounding areas.

One of the original materials employed for in digital data storage elements was a layer of fine-grain silver halide. Not only was a separate development step necessary but the exposed spot or bit did not possess a sharp edge. Because the silver halide emulsion possesses a distribution of grain sensitivities and the exposing laser has a sinusoidal intensity distribution, grains of higher sensitivity at the edge of the spot would develop while grains of low sensitivity in the same area would not. This results in a diffuse edge rather than a sharp delineation between exposed and unexposed areas.

A summary of materials currently under consideration as materials for optical storage may be found in the Journal of Micrographics, January, 1982, pps. 33–37.

U.K. patent application G. B. 2,042,753 published Sept. 24, 1980 in the name of Keith Elden Whitmore, is directed to imaging element containing microvessels. The microvessels are disclosed as retaining photosensitive imaging material such as silver halide grains. It is also disclosed at page 11 starting at line 69 that photographic images can be read out electronically by scanning a photographic element with a light source and a photosensor. It is further stated that the product of the British application is particularly suited to this electronic readout since each microvessel can provide one scanning site. By employing infectious development to produce high contrast, the photographic image being scanned provides either a substantially uniform dark area or light area in each microvessel. The information, therefore, taken from the photographic element is already in a binary logic form and can be scanned electronically and reproduced using digital electronic equipment. However, it should be noted that the photographic element being scanned is exclusively a pictorial photographic image and thus the information was not recorded as digitally encoded information.

Copending Application of Edwin H. Land, Ser. No. 234,937 filed Feb. 17, 1981, common assignee, is directed to a photosensitive element comprising single effective silver halide grains in a predetermined spaced array. In one embodiment, the predetermined spaced array comprises a regular geometric pattern of depressions in a surface in which the single effective grains are retained.

Since both copending application Ser. No. 234,937 and U.K. patent application G. B. 2,042,753 employ silver halide, they possess two of the desired attributes for optical data recording material; those of archival stability and high sensitivity. However, because silver halide is employed, as described above, a development step is required before reading which does not render the material suitable for use in direct-read-after-write applications.

A novel element for optically recording digitally encoded information which is not susceptible to the deficiences of the prior art has now been found.

SUMMARY OF THE INVENTION

The present invention is directed to an element for optically recording digitally encoded information which comprises a support carrying an array of discrete regular geometric spaced depressions in a surface wherein each of said depressions carries a material capable of a transformation in response to a level of radiation adapted to effect said transformation wherein the transformation is optically detectable. The transformation effected by the radiation may be a chemical or physical transformation which provides a change in the optical properties of the material whereby such a change can be optically detected.

DETAILED DESCRIPTION OF THE INVENTION

The present invention contemplates the use of a substrate carrying a regular geometric array of discrete spaced depressions in a surface wherein the depressions are spaced apart from each other and wherein a material capable of undergoing a transformation in response to a level of exposing radiation is placed in each depression. It should be understood that the term "depression", as used herein, is intended to refer to a hole or cavity in a substantially planar surface. Thus, each depression can be used to store a single bit of information and with the extremely small spacing employed, a high density digital information storage medium is achieved. Unlike prior art materials, the material which undergoes the transformation is not disposed in a continuous layer across the surface of the element but rather the recording material is substantially separated in each depression and insulated from interaction with recording material in an adjacent depression thereby limiting the transformation to the material within the selected depression and providing a detectable reaction only in the predetermined location. As stated above, the material disposed in each depression is a material capable of undergoing a transformation in response to exposure to a level of radiation adapted to effect a transformation wherein the transformation is optically detectable. Thus, the material in a single depression, upon exposure to, for example, a laser writing beam, will undergo a transformation which will be immediately detectable by the appropriate optical detecting means, for example, the same or a different laser beam. The transformation may be of a physical or, preferably, a chemical nature, which results in a detectable change in transmissivity or reflectivity of the element or another optically detectable effect, such as fluorescence.

The novel element of the present invention may employ depressions with substantially any desired center-to-center spacing. The size of the depressions is only limited by the methods available to form the depressions and the ability to focus the exposing laser beam. The diameter of the exposing laser spot size should be adjusted so that it is less than the diameter of a depression to avoid effecting transformation in more than one depression at a time. Preferably, the laser beam will be focussed down with a microscope objective to provide sufficient intensity to effect the transformation. In a particularly preferred embodiment the beam is focussed to approximately the size of the depression.

The depressions may be formed by various methods. For example, a layer of photoresist may be exposed through a mask and the exposed area dissolved away (in the case of a positive resist) or dissolving away the unexposed area (in the case of a negative resist) to form the depressions. Alternatively, a layer of deformable plastic may be embossed by an embossing tool with projections that conform to the size and shape of the desired depressions.

Still other methods involve the employment of direct electron beam writing or exposure through a mask produced by electron beam writing. The radiation employed through the ma=k can be visible light, UV light, X-rays, etc., so long as the specific mask has sufficient absorption of the exposing radiation to provide a usable pattern in the radiation-sensitive substrate. Such procedures are known to the art and are employed, for example, in semiconductor microcircuit fabrication.

A spaced array of depressions may also be employed by exposure of a suitable photoresist by a step-and-repeat modulated laser beam.

A particularly preferred method for forming the spaced array of depressions comprises the exposure of a photoresist by interfering coherent radiation in order to provide exposure sites with a desired spacing therebetween. Thus, exposure of the photoresist can be carried out by two interfering coherent beams wherein the beams providing the exposures are at an angle to each other. To produce individual cavities, two sequential two-beam exposures at 90° to each other are carried out. The intersection of maximum intensities of the two combined exposures will provide a greater degree of modification to the photoresist at the points of intersection than the remainder of the photosensitive material.

Preferably, the source of coherent radiation is a laser. The particular laser will be selected depending upon the absorption spectrum and spectral response characteristics of the specific photoresist employed.

Subsequent to exposure of the photoresist, the relief pattern is formed by developing the exposed photoresist. For example, employing a photoresist wherein solubilization is achieved by exposure (a positive photoresist), development of the exposed photoresist would result in the removal of selected areas to provide a relief pattern consisting of regular depressions or holes in the photoresist.

Additional details on the preparation of such depressions by two interfering coherent beams may be found in above-mentioned copending application Ser. No. 234,937 and copending application of James J. Cowan, Arthur M. Gerber and Warren D. Slafer, Ser. No. 234,959, filed Feb. 17, 1982 (common assignee).

More specifically, the depressions may range from about 0.5 to 10 micrometers, and preferably about 1 to 2 micrometers. The depth of the depressions will be determined by the desired amount of material to be contained therein.

In a preferred embodiment, the material employed in the depressions undergoes a chemical reaction in response to the "writing" beam. Thus, errors will be reduced since any energy input less than an amount necessary to trigger the chemical reaction will be ineffective. Since only an activating level of radiation can initiate the chemical reaction, not only is the shelf life of the element enhanced and the possibility of the introduction of extraneous information eliminated, but also the same laser at a lower power level can be used to "read" that is used to "write". It will be understood that power of the laser used to "write" will be less than an activating level.

The material in the depressions adapted to undergo a chemical change may be a single reactant or a plurality of reactants. For example, a dye in a suitable binder may be employed wherein the radiation, such as an infrared laser, disrupts the chromophore, producing the detectable optical change. In a particularly preferred embodiment, a mixture of zinc (a gray powder) and sulfur (a yellow powder) is employed in the depressions, which upon exposure to an activating level of radiation produces zinc sulfide (a fluorescent white powder).

The material in the depressions may also comprise a material which undergoes a physical change upon exposure to the required, predetermined level of radiation, which physical change is optically detectable. As an example of a suitable material which will undergo a physical change, mention may be made of a cermet, which is a mixture of small metallic or semiconducting particles embedded in an electrically insulating matrix. Upon exposure by the predetermined level of radiation, the small metallic particles would melt and recrystallize into larger grains which would result in higher optical reflectance. As stated above, the depressions would inhibit thermal conduction between adjacent pockets of cermet materials, thus effectively isolating the optical change to only the exposed depressions.

The arrangement of the element of the present invention prevents the overlap of two adjacent storage elements. The land or plateau between the individual depressions provides a means for indicating a clear line demarcation between one bit and another. Because overlap is not possible with the novel element of the present invention, a higher packing density of recorded information is possible than has been possible heretofore.

The novel elements of the present invention may be arranged in substantially any desired format. For example, square, rectangular or circular formats can be employed.

The novel digital data storage element of the present invention possess unique advantages over a continuous layer optical storage medium.

Any material employed for digital recording must employ tracks and sector markers so that the read-out head can locate and retrieve the recorded information. Optical disks which employ a continuous recording surface usually also employ a spiral groove and sector markers that are incorporated into the disks, often as a separate manufacturing step. In the element of the present invention, however, such tracks are an integral and inherent part of the element and a separate step to provide the tracking capability is not necessary. For example, in an element of the present invention in a rectangular format, each row of depressions would correspond to a track, while the plateaus between the depressions would function as timing markers.

The novel element of the present invention provides great flexibility with respect to information storage density. Because of the wide range of depression size and spacing, which can retain material to undergo transformation, an element may be fabricated with respect to substantially any exposing and detecting system with considerable freedom of choice of radiation levels.

It should be understood that the novel element of the present invention is not suitable for employment as a recording element for analog information, such as standard video signals.

What is claimed is:

1. A method for optically recording digitally encoded information which comprises exposing an element to focussed radiation, said element comprising an array of discrete regular geometric spaced depressions in a surface, each of said depressions carrying a mixture of zinc and sulfur, said mixture capable of transformation in response to a level of radiation adapted to effect said transformation, wherein said transformation is optically detectable substantially immediately after exposure to said radiation.

2. The method of claim 1 wherein said radiation is a laser beam.

3. The method of claim 1 wherein said depressions have a center-to-center spacing of about 0.5 to 10 micrometers.

4. The method of claim 3 wherein said center-to-center spacing is about 1 to 2 micrometers.

* * * * *